(12) United States Patent
Oh et al.

(10) Patent No.: US 9,558,503 B2
(45) Date of Patent: Jan. 31, 2017

(54) MATCHING MOBILE DEVICE TO TRANSACTION AND/OR CUSTOMER ACCOUNT

(71) Applicant: Sears Brands, L.L.C., Hoffman Estates, IL (US)

(72) Inventors: Sang Yoon Oh, Lake Zurich, IL (US); Yoav Shargil, Glen Ellyn, IL (US); Dennis Gandhi, Roselle, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

(21) Appl. No.: 14/476,935

(22) Filed: Sep. 4, 2014

(65) Prior Publication Data

US 2016/0071115 A1   Mar. 10, 2016

(51) Int. Cl.
*G06Q 30/02* (2012.01)
*G06Q 30/06* (2012.01)
*G06Q 20/20* (2012.01)
*G06Q 20/32* (2012.01)

(52) U.S. Cl.
CPC ........ *G06Q 30/0201* (2013.01); *G06Q 20/202* (2013.01); *G06Q 20/322* (2013.01); *G06Q 30/02* (2013.01); *G06Q 30/06* (2013.01)

(58) Field of Classification Search
CPC .............. G06Q 20/322; G06Q 20/3224; G06Q 30/0224; G06Q 30/0255; G06Q 30/0261
See application file for complete search history.

(56) References Cited

U.S. PATENT DOCUMENTS

| 2003/0065595 A1 | 4/2003 | Anglum | |
|---|---|---|---|
| 2008/0077488 A1* | 3/2008 | Main et al. | 705/14 |
| 2011/0288925 A1* | 11/2011 | Thomas et al. | 705/14.25 |

(Continued)

FOREIGN PATENT DOCUMENTS

EP           2413298           2/2012

OTHER PUBLICATIONS

"Euclid Analytics Technology for Retail", http://euclidanalytics.com/products/technology, dated Jul. 2, 2014, 7 pages.

(Continued)

*Primary Examiner* — Suezu Ellis
(74) *Attorney, Agent, or Firm* — McAndrews, Held & Malloy, Ltd.

(57) ABSTRACT

Systems, methods, and apparatus are disclosed that provide enhanced customer services based on detected mobile identifiers of mobile devices. One system includes a point-of-sale (POS) terminal, a wireless sensor, and a backend system. The POS terminal handles sales of items and generate transactions for sold items. The wireless sensor is positioned proximate the POS terminal and detects mobile identifiers from mobile devices proximate the POS terminal. The backend system receives transactions from the POS terminal and detected mobile identifiers from the wireless sensor. The backend system matches a received transaction to a received mobile identifier based on a detection time of an associated mobile device proximate the wireless sensor and a transaction time for an associated transaction of the POS terminal. The backend system updates a purchase history associated with the matched mobile identifier based on sold items of the matched transaction.

20 Claims, 5 Drawing Sheets

(56) References Cited

U.S. PATENT DOCUMENTS

| | | |
|---|---|---|
| 2013/0304536 A1 | 11/2013 | Hamachi |
| 2014/0058886 A1 | 2/2014 | Gopalakrishnan |
| 2014/0324527 A1* | 10/2014 | Kulkarni et al. ............ 705/7.29 |
| 2015/0066802 A1* | 3/2015 | Goulart et al. ............... 705/346 |
| 2015/0088658 A1* | 3/2015 | Iiduka et al. .............. 705/14.64 |
| 2016/0162870 A1* | 6/2016 | Henson .............. G06Q 20/3224 705/14.53 |

OTHER PUBLICATIONS

"Euclid—Products", http://euclidanalytics.com/products/express, dated Jul. 2, 2014, 5 pages.
"How Stores Use Your Phone's WiFI to track Your Shopping Habits", The Washington Post, dated Oct. 19, 2013, 4 pages.
"Indoor Location Technology Brings Internet-style Tracking to Physical Spaces", MIT Technology Review, dated Nov. 12, 2013, 3 pages.
"Location-based Wi-Fi Services Can Add Immediate Value to Wi-Fi Deployments", Network World, dated Oct. 10, 2013, 5 pages.
"12 Sneaky Ways That Big Retailers Track Your Every Move", Business Insider, dated Jan. 1, 2013, 12 pages.
Extended European Search Report for 15182750.8, dated Oct. 7, 2015 (8 pages).

* cited by examiner

MATCHING MOBILE DEVICE TO TRANSACTION AND/OR CUSTOMER ACCOUNT

FIELD

Certain embodiments of the present disclosure relate to retail services and, in particular, to customizing retail services to an identified customer.

BACKGROUND

Customers commonly visit retail stores to inspect, research, and/or acquire products they wish to purchase. Such retail stores may wish to personalize or otherwise customize the shopping experience for both new and frequent customers. However, many times the retail store has no information regarding the customer's identity. For example, a new customer may enter a retail store and purchase items with cash. In particular, the customer may not present any identifying information such a credit card, debit card, rewards card, club card, or some other form of identifying information at the point-of-sale terminal. Given the lack of identifying information presented by the customer, the retail store historically has had no way to relate the purchased items to this particular customer. As such, when the same customer returns to the retail store at a future date, the retail store is unable use the prior purchased items to personalize the retail experience for that customer.

In such situations, both the customer and retail store may miss out on valuable sales opportunities. For example, if the retail store were able to identify the customer, then the retail store may present the customer with targeted offers and discounts. Such targeted offers may not only result in additional sales for the retail store by may also save the customer money on items which the customer was planning to purchase elsewhere at a higher price.

Further limitations and disadvantages of conventional and traditional approaches will become apparent to one of skill in the art, through comparison of such systems with some aspects of the present disclosure as set forth in the remainder of the present disclosure with reference to the drawings.

BRIEF SUMMARY

Systems, methods, and computer readable media are directed to identifying a customer and/or a purchase history of a customer. Some embodiments may present the customer with targeted offers and/or other information based upon their purchase history and/or customer profile. Such systems, methods, and computer readable media are substantially shown in and/or described in connection with at least one of the figures, and are set forth more completely in the claims Advantages, aspects, and novel features of the present disclosure, as well as details of an illustrated embodiment thereof, will be more fully understood from the following description and drawings.

DETAILED DESCRIPTION

Certain embodiments of the present disclosure relate to systems, methods, and computer readable media that identify a customer and/or a purchase history of a customer based on a mobile device (e.g., a cell phone, smart phone, tablet, etc.) carried by the customer. Some embodiments may make such identification even though the customer has not registered for an account with the store or otherwise presented the store with identifying information (e.g., credit card, bank account number, debit card, store rewards card, driver's license, etc.). Moreover, some embodiments may present the customer with targeted offers and/or other information based upon their purchase history and/or customer profile.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
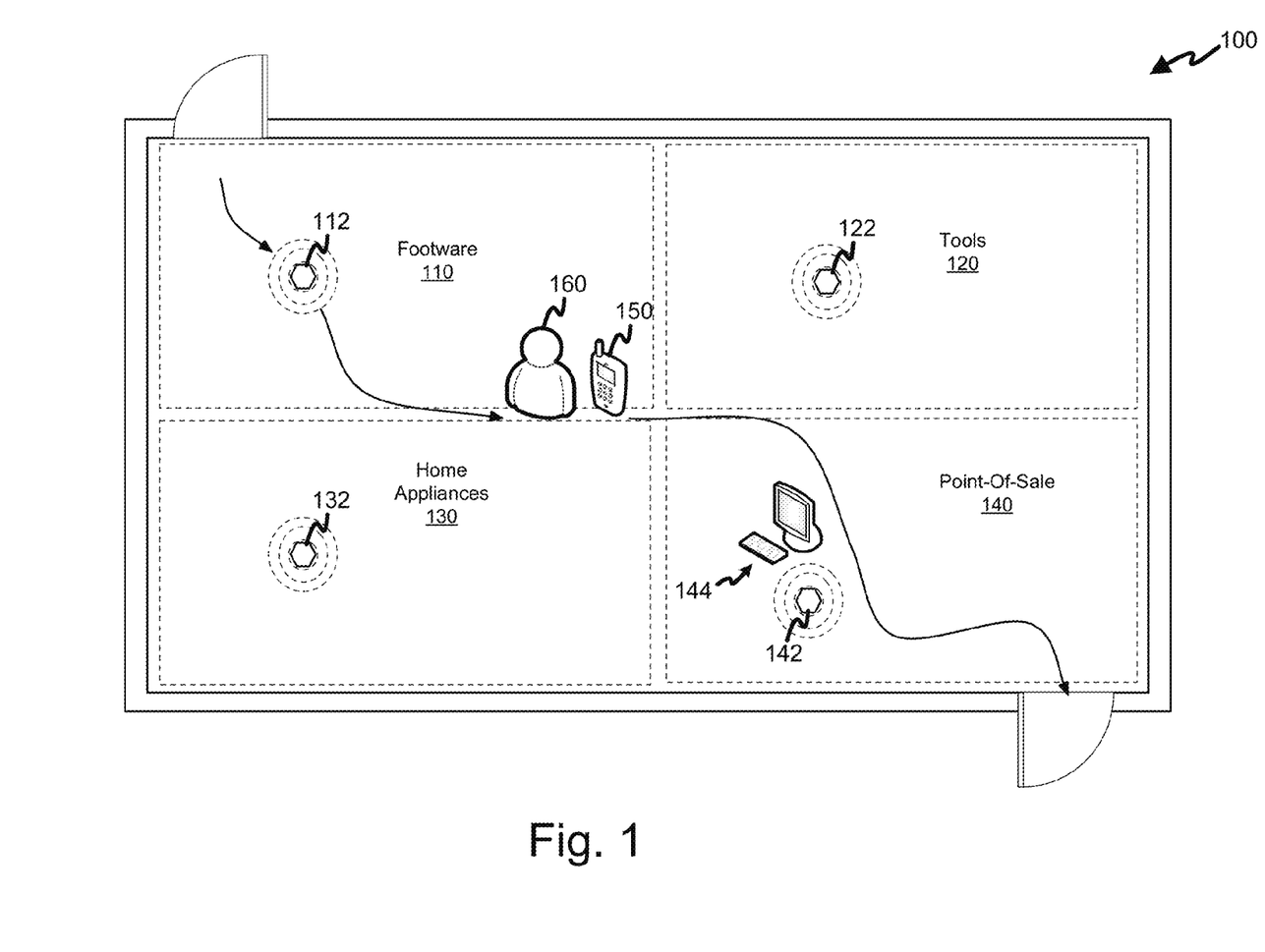
FIG. 1 provides a simplified view of a retail store having multiple departments or zones that are serviced by an enhanced customer services (ECS) system.

FIG. 1 shows a simplified layout of a retail store 100. As shown, the retail store 100 may have multiple zones or departments 110, 120, 130, 140 where related items of merchandise are displayed and available for purchase. For example, the retail store 100 may include a footware department 110, a tools or hardware department 120, a home appliances (HA) department 130, as well as an point-of-sales (POS) zone 140. As shown, each zone 110, 120, and 130 may include one or more wireless base stations configured to wirelessly track mobile devices 150 carried by customers 160. Moreover, the POS zone 140 may include one or more wireless sensors 142 that are associated with POS terminals 144.

The mobile devices 150 may include tablets, smart phones, mobile phones, personal data assistants, hand-held gaming consoles, and/or other forms of mobile devices which enable a user to communicate with wireless base stations or sensors 112, 122, 132, 142. In some embodiments, the mobile devices 150 may include one or more mobile applications or services comprising instructions that, in response to being executed, cause the mobile device 150 to interact with the wireless base stations 112, 122, 132, 142.

For example, the retail store 100 may develop a mobile application which its customers 160 may download and install on their mobile devices 150. The mobile application may cause the mobile device 150 to interact with the wireless base stations 112, 122, 132, 142 in a manner that permits tracking the location of a mobile device 150, sending messages to the customer 160 via the mobile device 150, and/or receiving message from the customer 160 via the mobile device. For example, the mobile application may provide the customer 160 with various services such as displaying a map of the store that includes depicting the customer's current location, displaying messages identifying promotions relevant to products found near the customer's current location, and/or other services that enhance the customer's shopping experience.

The retail store 100 may leverage the mobile application to provide customers 160 with enhanced services. However, some customers 160 may not install the mobile application on their mobile device 150. The retail store 100 may nonetheless desire to provide enhanced services to such customers 160 that elect to forego the mobile application. To this end, the retail store 100 may implement an enhanced customer services (ECS) system similar to the example ECS system 200 shown in FIG. 2.

Figure 2:
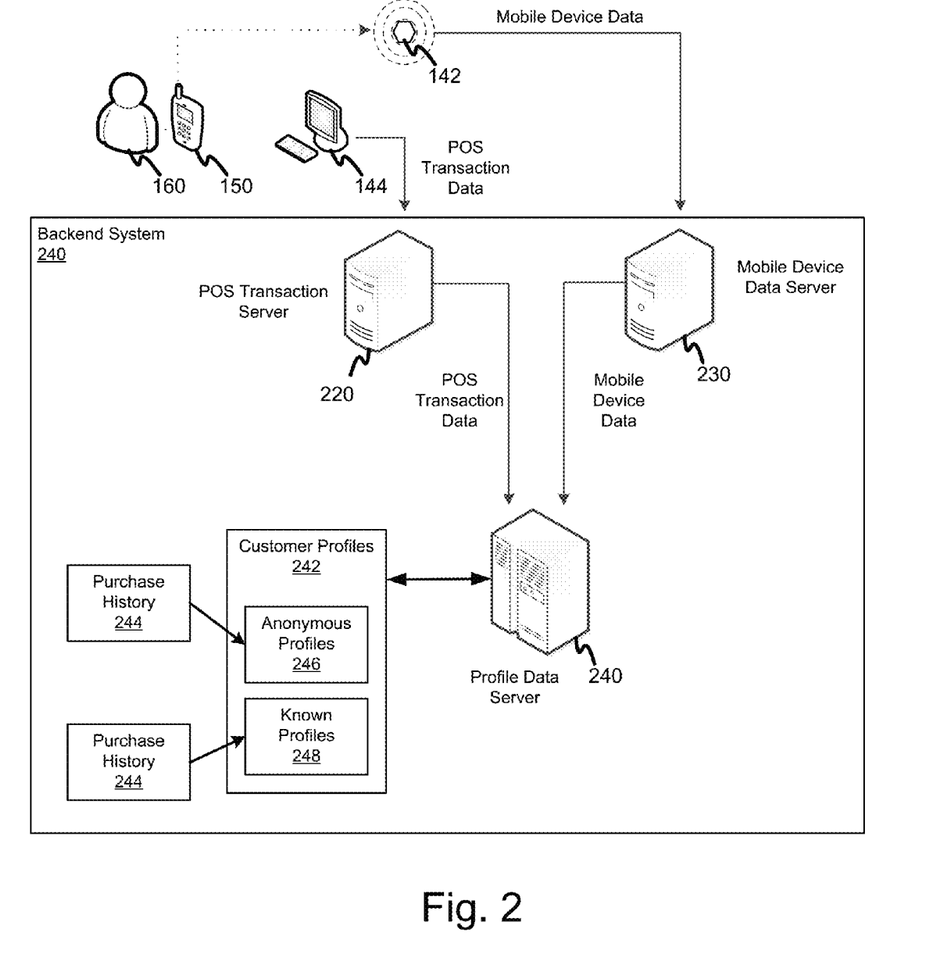
FIG. 2 shows an example embodiment of the ECS system of FIG. 1.

As shown, the ECS system 200 may include one or more wireless sensors 142 and one or more POS terminals 144 which may be placed in a POS zone 140 of the retail store 100 as shown in FIG. 1. The ECS system 200 may further include a backend system 210 which is coupled to the wireless sensors 142 and the POS terminals 144 via a network. The backend system 210 may be further coupled to the wireless base stations 112, 122, 132 shown in FIG. 1 via the network. As explained in greater detail below, the backend system 210 may receive mobile device data from the wireless sensors 142 and POS transaction data from the POS terminals 144, and may update and/or create customer profiles based upon the received data.

To this end, the backend system 210 may include one or more web servers, database servers, routers, load balancers, and/or other computing and/or networking devices. As shown, the backend system 210, in one embodiment, includes a POS transaction server 220, a wireless data server 230, and a profile data server 240 that each impart certain functionality to the backend system 210. Each of these servers 220, 230, 240, however, may be implemented using one or more web servers, database servers, routers, load balancers, and/or other computing and/or networking devices. Furthermore, while the following describes each of these servers 220, 230, 240 performing certain operations and fulfilling certain functions in an example embodiment, various operations and/or functions of these servers 220, 230, 240 may be distributed across multiple computing devices and/or consolidated into a single computing device in other embodiments.

In one embodiment, each POS terminal 144 may include a cash register, credit card reader, bar code scanner, conveyor belt, and/or other devices which are collectively used to process the sale of items to a customer 160. The POS terminals 144 may include both employee-assisted terminals and self-checkout terminals. A cashier and/or other store employees may operate the employee-assisted terminals to complete the sale of items to the customer. For example, the cashier may scan the items that the customer 160 may wish to purchase, collect payment for the items from the customer 160, and bag the purchased items for the customer 160. A self-checkout terminal, however, permits the customer 160 to complete the sale of items without the aid of a cashier and/or another employee of the retail store 100. In particular, without the aid of such a store employee, the customer 160 via the self-checkout terminal may scan the items to be purchased, pay for the items, bag the purchase items, and collect a sales receipt documenting the sale of items.

Regardless of the type of POS terminal 144, the POS terminal 144 may provide the POS transaction server 220 of the backend system 210 with POS transaction data for the completed sale of items. For example, the POS terminal 144 may provide the POS transaction server 220 with a transaction ID, a store ID, a POS terminal ID, a time stamp indicative of the date and time the transaction started, a time stamp indicative of the date and time the transaction completed, an itemized account of each item sold, payment information (e.g., credit card number, debit card number, bank account number, etc.), and a club/store member ID for the customer 160. It's unlikely that every transaction will include all of the above data items. However, to the extent the POS terminal 144 collects the respective data as a result of processing the POS transaction, the POS terminal 144 forwards the collected data to the POS transaction server 220. For example, the customer 160 may not have a club member ID or may not present their club member card. As such, the POS transaction data forwarded to the POS transaction server 220 may not include a club member ID for that particular transaction.

As noted above, the ECS system 200 further includes wireless sensors 142. In one embodiment, a separate wireless sensor 142 is associated with each POS terminal 144. In particular, the wireless sensors 142 may be positioned and tuned such that each wireless sensor 142 detects mobile devices 150 that are proximate its associated POS terminal 144 without detecting mobile devices 150 that are proximate other POS terminals 144. To this end, the wireless sensor 142 may by implemented using a variety of different standard or non-standard wireless protocols similar to those described in the IEEE 802.15.1 (Bluetooth), IEEE 802.11 (WiFi), and ISO/IEC 18092 (Near Field Communication (NFC)) standards.

While various different wireless protocols may be used, one embodiment utilizes WiFi wireless sensors due to the prevalent inclusion of WiFi interfaces in mobile devices 150. Moreover, unless the customer has actively turned-off the WiFi interface of their mobile device 150, the WiFi interface periodically transmits probe signals in order to scan for and locate nearby WiFi base stations. The WiFi wireless sensors 142 may detected these probe signals and identify a mobile device 150 based upon a MAC ID of the probe signal. The MAC ID is generally unique to WiFi interface. As such, the ECS system 200 may use the MAC ID as a mobile identifier (ID) to uniquely identify a mobile device 150 without requiring the customer 150 to register the mobile device 150 with the retail store 100 or otherwise manually associate the mobile device 150 with a customer profile or store/club account.

In response to detecting the probe signal or other information of proximate mobile devices 150, the wireless sensors 142 may forward mobile device data to the mobile device data server 230 of the backend system 210. In particular, the mobile device data provided to the mobile device data server 230 may include a mobile ID (e.g., the MAC ID) of the detected mobile device 150 and a time stamp that is indicative of the date and time the mobile device 150 was detected by the wireless sensor 142. The mobile device data may further include a POS terminal identifier that identifies the particular POS terminal 144 with which the wireless sensor 142 is associated and/or a wireless sensor identifier that identifies the wireless sensor 142 that detected the mobile device 150.

In addition to the POS transaction server 220 and the mobile device data server 230, the backend system 210 may further include a profile data server 240. The profile data server 240 generally maintains customer or member profiles 242 for customers 160. The customer profile 242 for a customer 160 may include a purchase history 244 for the customer 160. The purchase history 244 may include details regarding each item purchased by the customer 160. The customer profiles 242 may further have one or more associated identifiers via which the customer profile 242 for a particular customer 160 may be retrieved.

In one embodiment, the profile data server 240 may maintain both anonymous customer profiles 246 and known customer profiles 248. The anonymous customer profiles 246 may be associated with a particular, but unknown customer 160. For example, the anonymous customer profile 246 may include the purchase history 244 and other information collected for the unknown customer 160. But, the anonymous customer profile 246 may not include customer identifying information such as the customer's name, address, bank account, credit card, club/store member ID, etc. Besides the above information, the anonymous customer profile 246 may further have an associated mobile ID for the customer's mobile device 150. As such, the profile data server 240 of the backend system 210 may retrieve the appropriate anonymous profile 242 for a customer 160 from an associated database based on a detected mobile ID of the customer's mobile device 150.

The known customer profiles 248 like the anonymous customer profiles 246 may also be associated with a customer 160. Furthermore, the known customer profiles 248 may also be associated with a mobile ID of the customer's mobile device 150 to permit retrieval of the known customer profile 248 based on a detected mobile ID. However, besides the purchase history 244 and other collected information of the anonymous customer profiles 246, the known customer profiles 248 may further includes customer identifying information such as the customer's name, address, bank account, store/club member ID, etc. As such, the profile data server 240 may retrieve the appropriate customer profile 242 based upon any of the stored customer identifying data for the customer 160 as well as the mobile ID.

In general, the ECS system 200 detects mobile devices 150 proximate the POS terminals 144 via the wireless sensors 146 and matches POS transactions to the detected mobile devices 150. In this manner, the ECS system 200 may build a customer profile 242 for a customer 160 based on detection of their mobile device 150 and the POS transactions that were matched to the detected mobile device 150. Moreover, the ECS system 200 may build such a customer profile 242 even if the customer 160 does not install the retail store's mobile application and/or the customer 160 does not provide the retail store 100 with information (e.g., name, address, bank account identifier (ID), credit card ID, debit card ID, club card ID, store/club member ID, etc.) from which the customer 160 may be identified.

The ECS system 200 may utilize the built customer profile 242 to enhance the shopping experience of the customer 160 even if the customer 160 remains otherwise anonymous. In particular, the ECS system 200 may provide the customer 160 with advertisements, coupons, discounts, and/or other promotional offers based on the information collected in the customer profile 242 associated with the customer's mobile device 150. For example, the ECS system 200 may cause the POS terminal 144 to print coupons and/or other promotional offers on a sales receipt when the customer purchases items via a POS terminal 144. The ECS system 200 may also tailor or customize such promotional offers based on a purchase history 244 and/or other information maintained in the customer profile 242 for the mobile device 150.

The ECS system 200 may also utilize the built customer profile 242 to enhance the shopping experience of customers 160 other than the customer associated with the customer profile 242. For example, the ECS system 200 may utilize information from both anonymous customer profiles 246 and known customer profiles 248 to identify customers with similar shopping preferences and provide offers, advertisements, discounts, etc. based upon such identified customers.

Figure 3:
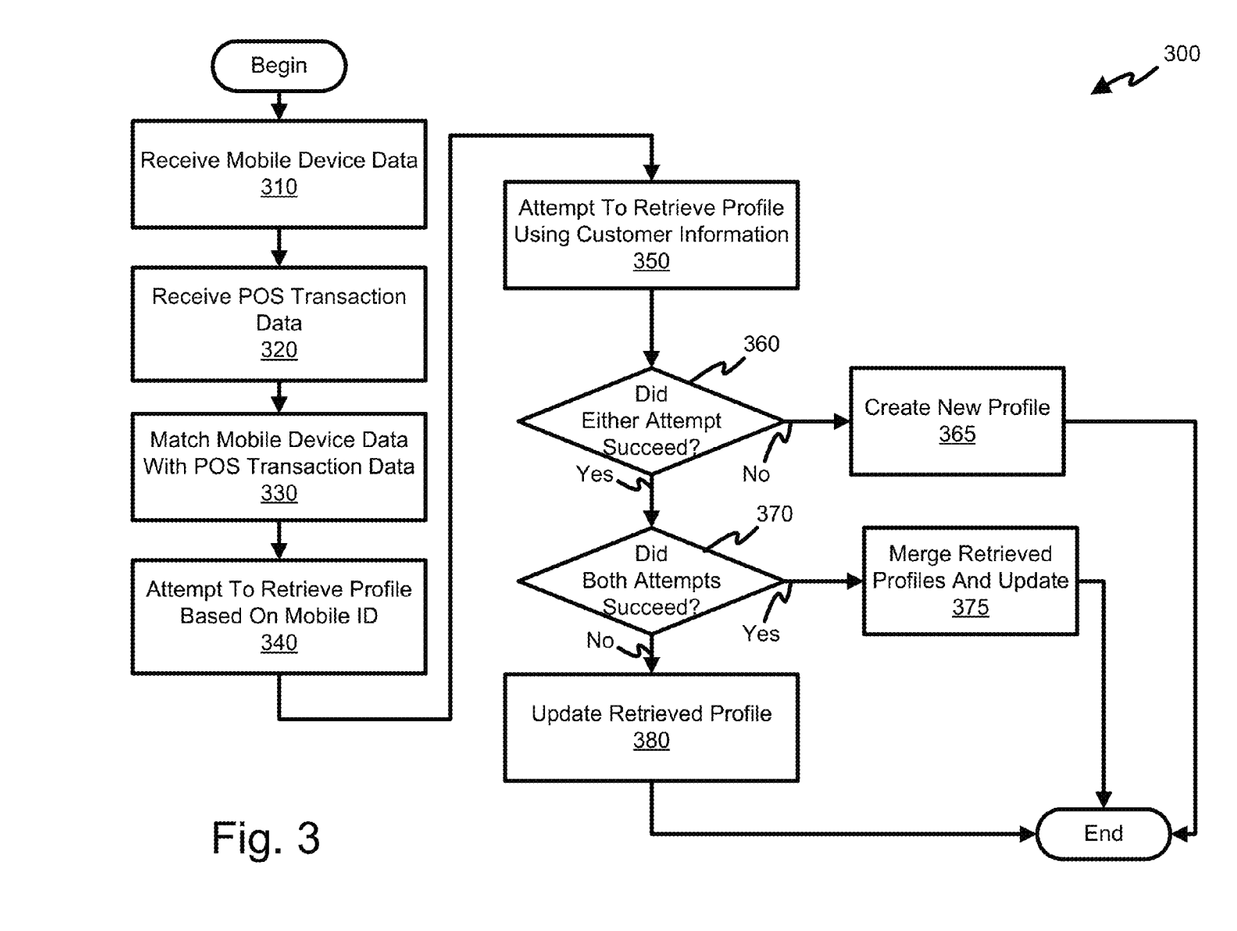
FIG. 3 shows an example matching process that may be implemented by a backend server of the ECS system shown in FIG. 2.

Referring now to FIG. 3, a flowchart illustrates aspects of an example mobile ID matching process 300 that may be implemented by the ECS system 200. In general, the ECS system 200 per the method 300 may retrieve a customer profile 242 based on a mobile ID and update the customer profile 242 based on information of a POS transaction. To this end, the wireless data server 230 of the backend system 210 may receive at 310 mobile device data from the wireless sensors 142. In particular, the wireless sensors 142 may provide the wireless data server 230 with mobile device data that includes a mobile ID of the detected mobile device 150 and a time stamp indicative of the date and time the mobile device 150 was detected by the wireless sensor 142.

At 320, the POS transaction server 220 of the backend system 210 may receive POS transaction data from the POS terminals 144. In particular, the POS terminal 144 may provide the POS transaction server 220 with a transaction ID, a store ID, a POS terminal ID, a time stamp indicative of the date and time the transaction started, a time stamp indicative of the data and time the transaction completed, an itemized account of each item sold, payment information (e.g., credit card ID, debit card ID, bank account ID, etc.), and a club/store member ID for the customer 160 to the extent the POS terminal 144 collected such information for the respective POS transaction.

At 330, the profile data server 240 of the backend system 210 may match mobile IDs received by the mobile device data server 230 with transaction data received by the POS transaction server 220. In one embodiment, the profile data server 240 performs such matching in real-time or near real-time. To this end, the POS transaction server 220 and the mobile device data server 230 may forward data to the profile data server 240 for further processing. In one embodiment, the POS transaction server 220 and the mobile device data server 230 simply forward all received POS transaction data and mobile device data to the profile data server 240 for processing. In other embodiments, the POS transaction server 220 and the mobile device data server 230 may pre-process, filter, and/or coalesce data before forwarding to the profile data server 240 for further processing. For example, the mobile device data server 230 may only forward mobile device data associated with when a wireless sensor 142 first detected the mobile device 150 and when the wireless sensor 142 last detected the mobile device 150, thus removing the potentially numerous data points associated with continued detection of the mobile device 150.

In another embodiment, the profile data server 240 may perform such matching of mobile IDs with POS transaction data via batch processing. To this end, the POS transaction server 220 and the mobile device data server 230 may periodically send the profile data server 240 batches of POS transaction data and mobile device data for processing. Alternatively, the profile data server 240 may periodically poll or request the POS transaction server 220 and the mobile device data server 230 for batches of data for processing.

Regardless of whether the profile data server 240 does real-time, near real-time, or batch-mode matching of mobile IDs with POS transaction data, the profile data server 240 may perform such matching using various techniques to ensure that the detected mobile IDs are properly matched to corresponding POS transaction data and vice versa. Details regarding various matching techniques are presented below in regard to FIGS. 4A-4C.

The profile data server 440 may then update and/or create a customer profile based on the detected mobile ID and matched POS transaction data. In particular, the profile data server 440 may determine whether a customer profile 442 currently exists for the mobile ID and/or matched POS transaction data. To this end, the profile data server 440 at 340 may attempt to retrieve a customer profile 442 based on the matched mobile ID. The profile data server 440 at 350 may further attempt to retrieve a customer profile 442 based on customer identifying information (e.g., customer's store/club member ID, name, credit card number, etc.) of the matched POS transaction data.

If neither attempt successfully retrieves a customer profile 442, then the profile data server 440 at 360 may determine there is no customer profile 442 for this customer 160 and may create a customer profile 442. In particular, the profile data server 440 at 365 may create a known customer profile 448 if the POS transaction data includes customer identifying data. Otherwise, the profile data server 440 may create an anonymous customer profile 446 for the customer 160. Regardless, the profile data server 440 may update the purchase history 444 of the created customer profile 442 based on the items identified in the POS transaction data and associate the matched mobile ID to the customer profile 442.

If both attempts successfully retrieve a customer profile 442, then the profile data server 440 at 370 may determine there are multiple customer profiles 442 for this customer 160 and may merge or otherwise combine the retrieved customer profiles 442. In particular, the profile data server 440 at 375 may update the retrieved known customer profile 448 for the customer 160 based on the information found in the retrieved anonymous customer profile 446 for the customer 160 and delete the anonymous customer profile 446. Moreover, the profile data server 440 may further update the purchase history 444 of the retrieved known customer profile 446 based on the items identified in the POS transaction data. The profile data server 440 may further associated the matched mobile ID with the known customer profile 446 and may update various customer identifying information based on the matched POS transaction data.

If only one of the attempts successfully retrieved a customer profile 442, then the profile data server 440 may determine there is only one existing customer profile 442 for this customer 160 and may update the retrieved customer profile 442. As a result, the profile data server 440 at 380 may update the purchase history 444 of the retrieved customer profile 442 based on the items identified in the POS transaction data. The profile data server 440 may further associated the matched mobile ID with the retrieved customer profile 442 and may update customer identifying information based on the matched POS transaction data.

The ECS system 200 is described above as performing the example mobile ID matching process 300 as a series of sequential operations. However, in some embodiments, the ECS system 200 may perform one or more operations of the mobile ID matching process 300 in parallel with one or more other operations of the process 300.

Figure 4A:
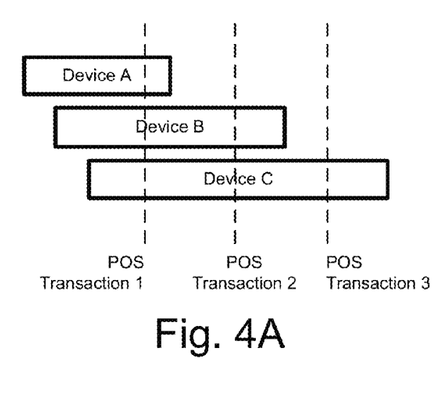
FIGS. 4A-4C depict various time lines for detected mobile devices and completed POS transactions that are used to explain various matching techniques that may be employed by a backend server of the ECS system shown in FIG. 2.
Figure 4B:
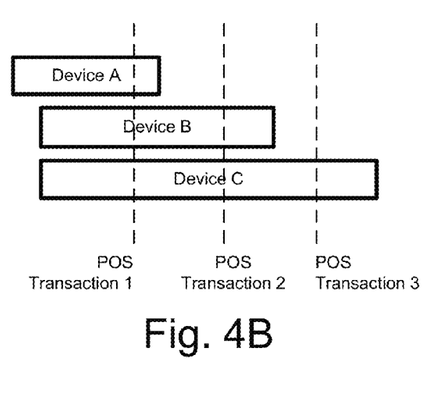
Figure 4C:
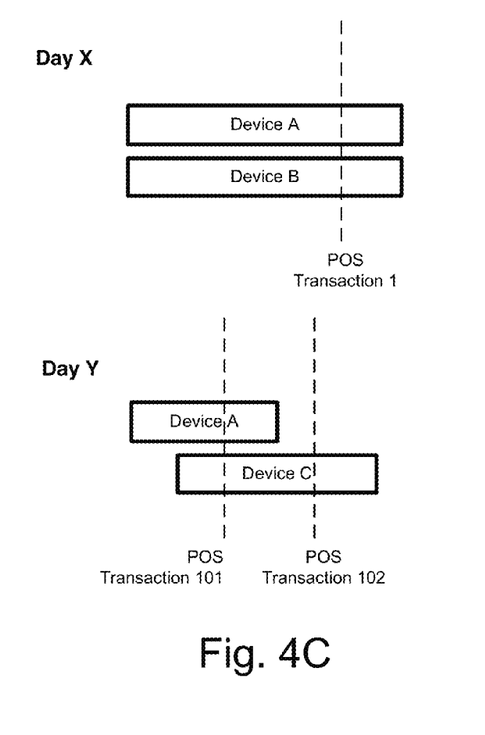

Referring now to FIGS. 4A-4C, various matching techniques that may be used by the profile data server 440 will be described. In particular, a matching technique that matches mobile IDs with POS transaction data based on detected entrance or arrival times of the mobile IDs is first addressed with respect to FIG. 4A. In particular, FIG. 4A depicts a time period in which multiple people have queued-up at a POS terminal 144. During the depicted time period, the wireless sensor 142 associated with the POS terminal 144 detected three mobile devices A, B, and C. In particular, the wireless sensor 142 detected a different arrival time and different departure time for each mobile device A, B, and C. During the depicted time period, the POS terminal 144 likewise completed three separate POS transactions. The three POS transactions are depicted in chronological order as POS Transaction 1, POS Transaction 2, and POS Transaction 3. In such a situation, the profile data server 240 may match the mobile devices A, B, and C to the POS Transactions 1, 2, and 3 based on arrival times as described below.

The profile data server 240 may recognize based on mobile device data received for mobile devices A, B, and C that the mobile device A was the first mobile device 150 to queue-up at the POS terminal 144. As such, the mobile device A most likely corresponds to the POS Transaction 1 which was the first POS transaction. Similarly, the profile data server 240 may recognize that the mobile device B was the second mobile device 150 to queue-up at the POS terminal 144 and therefore match the mobile device B to the POS Transaction 2 which was the second POS transaction. Finally, the profile data server 240 may recognize that the mobile device C was the third mobile device 150 to queue-up at the POS terminal 144 and therefore match the mobile device C to the POS Transaction 3 which was the third POS transaction.

Another matching technique is described in respect to FIG. 4B. In general, the matching technique with respect to FIG. 4B matches mobile IDs with POS transaction data based on detected exit or departure times of the mobile IDs. In particular, FIG. 4B depicts a time period in which multiple people queued-up at a POS terminal 144. During the depicted time period, the wireless sensor 142 associated with the POS terminal 144 detected three mobile devices A, B, and C. In particular, the wireless sensor 142 detected a different departure time for each mobile device A, B, and C. However, unlike the time period of FIG. 4A, mobile device B and C were detected as having the same or very similar arrival times.

During the depicted time period, the POS terminal 144 likewise completed three separate POS transactions. The three POS transactions are depicted in chronological order as POS Transaction 1, POS Transaction 2, and POS Transaction 3. In such a situation, the profile data server 240 may match the mobile devices A, B, and C to the POS Transactions 1, 2, and 3 based on departure times as described below.

For POS transaction 3, the profile data server 240 may recognize, based on mobile device data received for mobile devices A, B, and C, that the mobile devices A and B had already departed and that only mobile device C was still present. As such, the profile data server 240 may match mobile device C with POS transaction 3. For POS transaction 2, the profile data server 240 may recognize that only mobile device B and C are present, but mobile device C has already been matched to POS transaction 3. Thus, the profile data server 240 may match mobile device B with POS transaction 2. For POS transaction 1, the profile data server 240 may recognize mobile devices A, B, and C are present. However, mobile device B and C have already been respectively matched to POS transactions 2 and 3. Accordingly, the profile data server 240 may match mobile device A with POS transaction 1.

A matching technique that utilizes data from multiple days is describe in respect to FIG. 4C. In particular, FIG. 4C depicts a time period of day X in which multiple people queued-up at a POS terminal 144 and a time period of a subsequent day Y in which multiple people queued-up at a POS terminal 144. During the depicted time periods, wireless sensors 142 associated with the POS terminals 144 detect three mobile devices A, B, and C. In particular, the wireless sensors 142 detected that mobile devices A and B have the same or very similar arrival and departure times on day X, but the mobile devices A and C having different arrival and departure times on day Y. As shown, a single POS transaction 1 is associated with mobile devices A and B on day X, but two POS transactions 101, 102 are associated with mobile devices A and C on day Y.

In such a situation, the profile data server 240 on day X may tentatively create an anonymous customer profile 244 that includes mobile devices A and B and a purchase history 244 based on the POS transaction 1. On day Y, the profile data server 240 using arrival time and/or departure time matching may match mobile device A with POS transaction 101 and mobile device C with POS transaction 102. Besides updating the anonymous customer profile 244 for mobile device A based on the POS transaction 101, the profile data server 240 may also delete the mobile ID for mobile device B from the profile.

The above matching techniques were individually described in regard to FIGS. 4A-4C. However, some embodiments may employ one or more of the above matching techniques. In particular, the profile data server 240 may match some mobile IDs with POS transaction data using arrival times, other mobile IDs with POS transaction data using departure times, other mobile IDS with POS transaction data using both arrival and departure times, and yet other mobile IDS with POS transaction data using a combination of all three (e.g., arrival times, departure times, a data from multiple days). Furthermore, the above matching techniques are described as a binary decision, namely the profile data server 240 either matches a particular mobile ID to particular POS transaction data or not. In some embodiments, the profile data server 240 may utilize fuzzy logic to in essence generate confidence measures of a particular mobile ID matching particular POS transaction data and associate mobile IDs with POS transaction data when confidence measures exceed some threshold level.

As noted above, FIG. 2 depicts an example embodiment of the ECS system 200. However, the ECS system 200 may be implemented in numerous different manners using a wide range of different computing devices, platforms, networks, etc. Moreover, aspects of the ECS system 200 may be implemented using a client/server architecture, a peer-to-peer (P2P) architecture, and/or another networking architecture. Such embodiments are envisioned and protection for such embodiments is sought to the extent encompassed by the appended claims.

Figure 5:
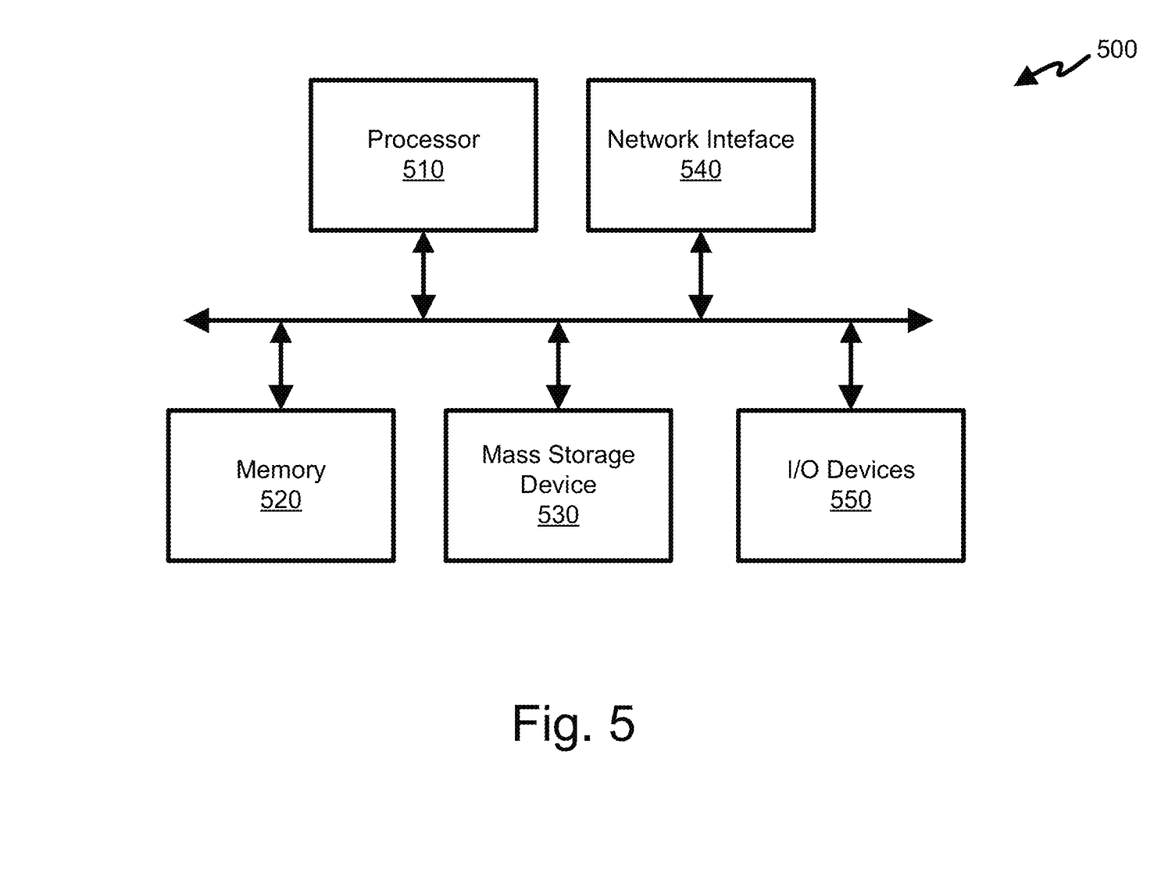
FIG. 5 depicts an example computing device that may be used to implement various computing devices of the ECS system shown in FIG. 2.

In some embodiments, the mobile devices 150, the back-end servers 220, 230, 240, and POS terminals 144 may be implemented using various types of computing devices. FIG. 5 provides a simplified depiction of a computing device 500 suitable for such aspects of the ECS system 200. As shown, the computing device 500 may include a processor 510, a memory 520, a mass storage device 530, a network interface 540, and various input/output (I/O) devices 550. The processor 510 may be configured to execute instructions, manipulate data and generally control operation of other components of the computing device 500 as a result of its execution. To this end, the processor 510 may include a general purpose processor such as an x86 processor or an ARM processor which are available from various vendors. However, the processor 510 may also be implemented using an application specific processor and/or other circuitry.

The memory 520 may include various types of random access memory (RAM) devices, read only memory (ROM) devices, flash memory devices, and/or other types of volatile or non-volatile memory devices. In particular, such memory devices of the memory 520 may store instructions and/or data to be executed and/or otherwise accessed by the processor 510. In some embodiments, the memory 520 may be completely and/or partially integrated with the processor 510.

In general, the mass storage device 530 may store software and/or firmware instructions which may be loaded in memory 520 and executed by processor 510. The mass storage device 530 may further store various types of data which the processor 510 may access, modify, and/otherwise manipulate in response to executing instructions from memory 520. To this end, the mass storage device 530 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 540 may enable the computing device 500 to communicate with other computing devices via a network. To this end, the networking interface 540 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 500 and network and/or another computing device. In particular, as noted above in regard to the mobile device 150, the networking interface 540 may include or by associated with an identifier (e.g., a MAC identifier) that is unique or generally unique to the mobile device 150.

Finally, the I/O devices 550 may generally provide devices which enable a user to interact with the computing device 500 by either receiving information from the computing device 500 and/or providing information to the computing device 500. For example, the I/O devices 550 may include display screens, keyboards, mice, touch screens, microphones, audio speakers, digital cameras, optical scanners, RF transceivers, etc.

While the above provides some general aspects of a computing device 500, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 500 are not presented from a limiting standpoint but from a generally illustrative standpoint. The present disclosure envisions that aspects of the present disclsoure may find utility across a vast array of different computing devices and the intention is not to limit the scope of the present disclosure to a specific computing device and/or computing platform beyond any such limits that may be found in the appended claims.

Aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after:
a) conversion to another language, code or notation; and/or
b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   receiving, with a wireless sensor positioned proximate a point-of-sale terminal during a first time period, a probe signal from each wireless interface of a plurality of mobile devices that are respectively associated with a plurality of customers;
   extracting from each probe signal a time stamp that is indicative of when a respective probe signal was received by the wireless sensor and a mobile identifier that identifies a mobile device of the plurality of mobile devices whose wireless interface transmitted the probe signal;
   receiving, during the first time period, a plurality of transactions from the point-of-sale terminal, wherein each transaction identifies one or more sold items;
   matching, from the plurality of mobile devices, a mobile device that is most likely associated with the customer who purchased the sold items identified by a transaction from the plurality of transactions, wherein the matching is based on the time stamps and mobile identifiers extracted from the probe signals received during the first time period and on a transaction time indicative of when the transaction occurred at the point-of-sale terminal; and
   in response to said matching the mobile device, updating a purchase history associated with the mobile identifier for the matched mobile device based on the sold items identified by the transaction.

2. The method of claim 1, further comprising wirelessly transmitting, to the mobile device associated with the mobile identifier for the matched mobile device, a message created based on the purchase history associated with the mobile identifier.

3. The method of claim 1, wherein said updating a purchase history comprises:
   locating a customer profile based on the mobile identifier for the mobile device; and
   updating a purchase history of the located customer profile.

4. The method of claim 1, wherein said updating a purchase history comprises:
   creating a new customer profile in response to determining that the mobile identifier for the matched mobile device is not associated with an existing customer profile;
   adding the mobile identifier for the matched mobile device to the new customer profile; and
   updating a purchase history of the new customer profile.

5. The method of claim 1, further comprising:
   receiving customer identifying information from the point-of-sale terminal for ones of the one or more transaction;
   creating a new customer profile in response to determining that the mobile identifier for the matched mobile device is not associated with an existing customer profile; and
   adding the mobile identifier for the matched mobile device and the customer identifying information to the new customer profile;
   wherein said updating a purchase history comprises updating a purchase history of the new customer profile.

6. The method of claim 1, wherein:
   receiving, from the point-of-sale terminal, customer identifying information for the transaction;
   locating a customer profile based on the mobile identifier for the matched mobile device; and
   updating the located customer profile based on the customer identifying information for the transaction.

7. The method of claim 1, further comprising:
   locating a first customer profile based on the mobile identifier for the matched mobile device;
   locating a second customer profile based on customer identifying information associated with the transaction; and
   merging a purchase history of the first customer profile and a purchase history of the second customer profile.

8. The method of claim 1, wherein:
   said matching is further based on arrival times obtained from the extracted time stamps for each of the plurality of mobile devices; and
   each arrival time is indicative of an arrival of the associated mobile device at the point-of-sale terminal.

9. The method of claim 1, wherein:
   said matching is further based on departure times obtained from the extracted time stamps for each of the plurality of mobile devices; and
   each departure time is indicative of a departure of the associated mobile device from the point-of-sale terminal.

10. The method of claim 1, wherein said matching is further based on transactions from multiple days.

11. A system for use with a plurality of mobile devices that are respectively associated with a plurality of customers, the system comprising:
    a point-of-sale terminal configured to handle sales of items and generate transactions for items sold via the point-of-sale terminal;
    a wireless sensor positioned proximate the point-of-sale terminal and configured to:
       receive a probe signal from each wireless interface of the plurality of mobile devices; and
       extract from each probe signal a time stamp that is indicative of when a respective probe signal was received by the wireless sensor and a mobile identifier that identifies a mobile device from the plurality of mobile devices proximate the point-of-sale terminal whose wireless interface transmitted the probe signal; and a backend system configured to:
receive a plurality of transactions from the point-of-sale terminal;
receive time stamps and mobile identifiers from the wireless sensor;
match, from the plurality of mobile devices, a mobile device that is most likely associated with the customer who purchased sold items identified by a transaction from the plurality of transactions based on the received time stamps and mobile identifiers and on a transaction time indicative of when the transaction occurred at the point-of-sale terminal; and
in response to matching the mobile device, update a purchase history associated with the mobile identifier for the match mobile device based on the sold items identified by the transaction.

12. The system of claim 11, wherein the backend system is further configured to locate a customer profile based on the mobile identifier for the matched mobile device, and update the located customer profile based on customer identifying information received for the transaction.

13. The system of claim 11, further comprising a wireless transmitter configured to transmit messages to mobile devices, wherein the backend system is further configured to create a message based on the purchase history associated with the mobile identifier for the matched mobile device, and cause the wireless transmitter to transmit the message to the matched mobile device.

14. The system of claim 11, wherein the backend system is further configured to:
create a new customer profile in response to determining that the mobile identifier for the matched mobile device is not associated with an existing customer profile;
add the mobile identifier for the matched mobile device to the new customer profile; and
update a purchase history of the new customer profile based on the sold items identified by the transaction.

15. The system of claim 11, wherein the backend system is further configured to:
receive, from the point-of-sale terminal, information that identifies a customer associated with a transaction;
create a new customer profile in response to determining that the mobile identifier for the matched mobile device is not associated with an existing customer profile;
add the mobile identifier for the matched mobile device and the information that identifies the customer associated with the transaction to the new customer profile; and
update a purchase history of the new customer profile based on the sold items identified by the transaction.

16. A non-transitory computer readable storage medium comprising a plurality of instructions, that in response to being executed, result in a computing system:
receiving, from a wireless sensor positioned proximate a point-of-sale terminal during a first time period, a time stamp and a mobile identifier extracted from a probe signal transmitted from each wireless interface of a plurality of mobile devices that are respectively associated with a plurality of customers, wherein each time stamp is indicative of when a respective probe signal was received by the wireless sensor and each mobile identifier identifies a mobile device of the plurality of mobile devices whose wireless interface transmitted the probe signal;
receiving, during the first time period, a plurality of transactions from the point-of-sale terminal, wherein each transaction identifies one or more sold items;
matching, from the plurality of mobile devices, a mobile device that is most likely associated with the customer who purchased the sold items identified by a transaction from the plurality of transactions, wherein the matching is based on the time stamps and mobile identifiers extracted from the probe signals received during the first time period and on a transaction time indicative of when the transaction occurred at the point-of-sale terminal; and
in response to said matching the mobile device, updating a purchase history associated with the mobile identifier for the matching mobile device based on the sold items identified by the transaction.

17. The non-transitory computer readable storage medium of claim 16, wherein the plurality of instructions further result in the computing system:
locating a customer profile based on the mobile identifier for the matching mobile device; and
updating the located customer profile based on customer identifying information received for the transaction.

18. The non-transitory computer readable storage medium of claim 16, wherein the plurality of instructions further result in the computing system:
locating a first customer profile based on the mobile identifier for the matching mobile device;
locating a second customer profile based on customer identifying information associated with the transaction; and
merging a purchase history of the first customer profile and a purchase history of the second customer profile.

19. The non-transitory computer readable storage medium of claim 16, wherein the plurality of instructions further result in the computing system matching the mobile device further based on arrival times obtained from the extracted time stamps for each of the plurality of mobile devices, each arrival time indicative of an arrival of the associated mobile device at the point-of-sale terminal.

20. The non-transitory computer readable storage medium of claim 16, wherein the plurality of instructions further result in the computing system matching the mobile device further based on departure times obtained from the extracted time stamps for each of the plurality of mobile devices, each departure time indicative of a departure of the associated mobile device from the point-of-sale terminal.

* * * * *